(12) United States Patent
Leyh et al.

(10) Patent No.: US 11,356,856 B2
(45) Date of Patent: Jun. 7, 2022

(54) REALLOCATION OF SPECTRAL RESOURCES IN MULTIWAVEFORM SYSTEMS

(71) Applicant: MOTOROLA SOLUTIONS, INC., Chicago, IL (US)

(72) Inventors: Arthur Christopher Leyh, Spring Grove, IL (US); Gregory J. Buchwald, Crystal Lake, IL (US); Rodney W. Hagen, Lake In The Hills, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 155 days.

(21) Appl. No.: 16/928,964

(22) Filed: Jul. 14, 2020

(65) Prior Publication Data

US 2022/0022046 A1 Jan. 20, 2022

(51) Int. Cl.
| | |
|---|---|
| *H04W 16/14* | (2009.01) |
| *H04W 76/12* | (2018.01) |
| *H04W 36/14* | (2009.01) |
| *H04W 48/16* | (2009.01) |
| *H04W 72/04* | (2009.01) |
| *H04W 88/06* | (2009.01) |

(52) U.S. Cl.
CPC .......... *H04W 16/14* (2013.01); *H04W 36/14* (2013.01); *H04W 48/16* (2013.01); *H04W 72/0453* (2013.01); *H04W 76/12* (2018.02); *H04W 88/06* (2013.01)

(58) Field of Classification Search
CPC ..... H04W 16/14; H04W 76/12; H04W 36/14; H04W 48/16; H04W 72/0453; H04W 88/06
See application file for complete search history.

(56) References Cited

U.S. PATENT DOCUMENTS

| | | |
|---|---|---|
| 9,088,989 B2 | 7/2015 | Smith et al. |
| 9,504,034 B2 | 11/2016 | Horn |

(Continued)

OTHER PUBLICATIONS

International Search Report and Written Opinion for Application No. PCT/US2021/037385 dated Sep. 24, 2021 (14 pages).

*Primary Examiner* — Dai Phuong (74) *Attorney, Agent, or Firm* — Michael Best & Friedrich LLP (57) ABSTRACT

Apparatus and method for reallocation of spectral resources in multiwaveform systems. One embodiment provides a base station operating in a narrowband spectrum and broadband spectrum that share a band allocation of RF spectrum. The base station includes a narrowband transceiver, a broadband transceiver, and an electronic processor coupled to the narrowband transceiver and the broadband transceiver. The electronic processor is configured to determine that a traffic load on the narrowband transceiver is increasing and determine a number of additional carrier channels based on the traffic load to operate the narrowband transceiver within a predefined blocking rate. The electronic processor is also configured to reduce a bandwidth of the broadband transceiver based on the number of additional carrier channels and assign additional carrier channels to the narrowband transceiver to operate the narrowband transceiver with the number of additional carrier channels.

20 Claims, 7 Drawing Sheets

(56) References Cited

U.S. PATENT DOCUMENTS

| | | | |
|---|---|---|---|
| 2009/0029710 A1* | 1/2009 | Ochiai | H04L 5/023 |
| | | | 455/450 |
| 2009/0105925 A1* | 4/2009 | Harada | G08G 1/0104 |
| | | | 701/99 |
| 2012/0039268 A1 | 2/2012 | Hakkinen et al. | |
| 2013/0182680 A1* | 7/2013 | Choi | H04W 36/14 |
| | | | 370/331 |
| 2013/0308587 A1 | 11/2013 | Zhang et al. | |
| 2014/0241261 A1 | 8/2014 | Ratasuk et al. | |
| 2015/0057040 A1 | 2/2015 | Kuehner | |
| 2017/0295578 A1 | 10/2017 | Khoshnevisan et al. | |
| 2018/0014312 A1* | 1/2018 | Ezaki | H04W 72/1247 |
| 2019/0158229 A1* | 5/2019 | Wei | H04W 76/28 |

\* cited by examiner

REALLOCATION OF SPECTRAL RESOURCES IN MULTIWAVEFORM SYSTEMS

BACKGROUND OF THE INVENTION

The 900 MHz band covering frequency spectrum between 896-901 MHz and between 935-940 MHz was designated for narrowband private land mobile radio (LMR) communications. The 900 MHz band was primarily used for two-way communication by land transportation, utility, manufacturing, and petrochemical companies. The Federal Communications Commissions (FCC) has approved a plan that restructures the 900 MHz band for use by both narrowband private land mobile radio (LMR) communication and broadband private long-term evolution (LTE) communication. Specifically, the frequency ranges 897.5-900.5 MHz and 936.5-939.5 MHz are designated for LTE communication, while the frequency ranges 896-897.5 MHz, 900-900.5 MHz, 935-936.5 MHz, and 939.5-940 MHz are designated for LMR communication.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

The restructuring of the existing 900 MHz spectrum allows users to use both narrowband and broadband communication systems together with existing infrastructure. For example, current base stations may be repurposed for both narrowband LMR communication and broadband LTE communications. During many operations, the repurposed spectrum is sufficient to provide both LMR applications and LTE applications to portable and fixed access communications devices that communicate over the allocated spectrum bandwidths.

Broadband LTE delivers improved data performance over narrowband communication systems. However, LTE lacks the robustness and reliability of narrowband LMR communication systems. For this reason, LMR is preferred for emergency or mission critical situations.

In emergency or mission critical situations, the LMR system may have to support a large number of users. For example, during a natural disaster or other emergency event, a base station of a utility company may have to support devices of users from not only the current utility location but of any volunteers or employees from a neighboring utility location. The reduced LMR bandwidth may not be sufficient to reliably support the additional devices operating on the LMR system. In some situations, performance may be further degraded due to out of band emissions from the LTE system.

Accordingly, there is a need for availing more spectrum for narrowband LMR use and/or for improving the quality of spectrum used for narrowband LMR while still maintaining at least some broadband LTE functionality.

One embodiment provides a base station operating in a narrowband spectrum and broadband spectrum that share a band allocation of RF spectrum. The base station includes a narrowband transceiver, a broadband transceiver, and an electronic processor coupled to the narrowband transceiver and the broadband transceiver. The electronic processor is configured to determine that a traffic load on the narrowband transceiver is increasing and determine a number of additional carrier channels based on the traffic load to operate the narrowband transceiver within a predefined blocking rate. The electronic processor is also configured to reduce a bandwidth of the broadband transceiver based on the number of additional carrier channels and assign additional carrier channels to the narrowband transceiver to operate the narrowband transceiver with the number of additional carrier channels.

Another embodiment provides a method for operating a base station. The method includes determining, using an electronic processor of the base station, that a traffic load on a narrowband transceiver of the base station is increasing and determining, using the electronic processor, a number of additional carrier channels to operate the narrowband transceiver within a predefined blocking rate. The method also includes reducing, using the electronic processor, a bandwidth of a broadband transceiver of the base station based on the number of additional carrier channels and assigning, using the electronic processor, additional carrier channels to the narrowband transceiver to operate the narrowband transceiver with the number of additional carrier channels.

Figure 1A:
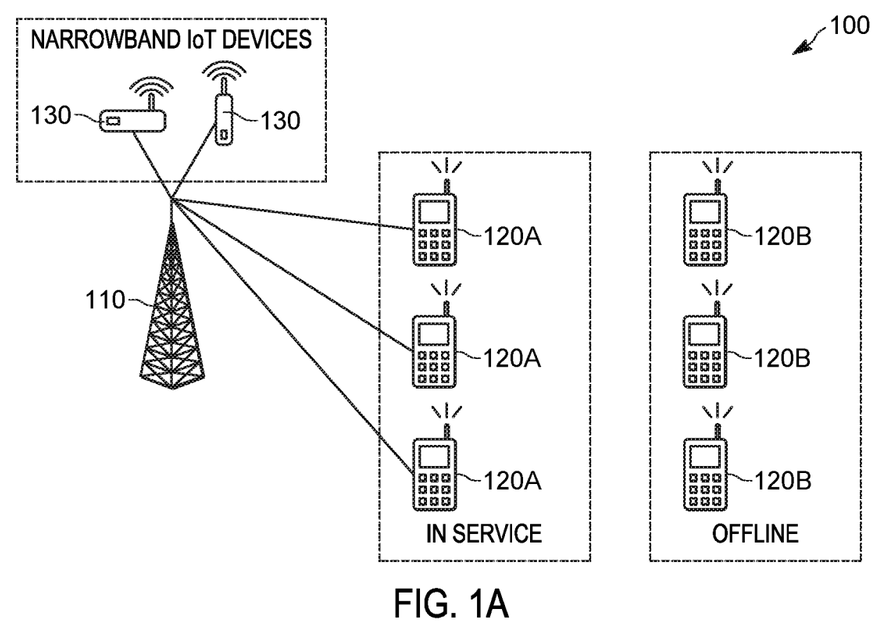
FIG. 1A illustrates a communication system during a first or normal mode of operation in accordance with some embodiments.

FIG. 1A illustrates a communication system 100 employed by an organization (for example, a public utility, a manufacturing facility, a petrochemical company, and the like) during normal operation or a first mode of operation (for example, operation during non-exceptional period of demand). The communication system 100 includes a base station 110 communicating with a first plurality of portable communications devices 120A and a plurality of narrowband internet of things (IoT) devices 130. A second plurality of portable communications devices 120B are either offline or do not belong to the entity operating the communication system 100. The first plurality of portable communications devices 120A and the second plurality of portable communications devices 120B are collectively referred to as portable communications devices 120. The portable communications devices 120 are, for example, portable two-way radios, mobile two-way radios, smart telephones, tablet computers, laptop computers, and the like. The first plurality of portable communications devices 120 are online during normal operation of the communication system 100. The narrowband IoT devices 130 are, for example, sensors, vehicles, and any other devices that are configured for narrowband IoT. For example, a utility company may use various kinds of sensors during delivery of the utility to a consumer. These sensors may be equipped with a wireless chip that communicates data from the sensor to a main server of the utility company. The wireless chip allows communication between the narrowband IoT device 130 and the base station 110 over a narrowband communication spectrum. The plurality of narrowband IoT devices 130 may be online during any operation of the communication system 100.

The base station 110 operates in a narrowband spectrum (for example, 896-897.5 MHz, 900-900.5 MHz, 935-936.5 MHz, and 939.5-940 MHz) and a broadband spectrum (for example, 897.5-900.5 MHz and 936.5-939.5 MHz) that share a band allocation of radio-frequency (RF) spectrum (for example, the 900 MHz band). The base station 110 may communicate with the first plurality of devices over both narrowband and broadband communication systems for various applications. For example, narrowband LMR communication system may be used to implement voice communication between the portable communications devices 120, while broadband LTE communication system may be used to implement data communication between application servers and portable communications devices 120 and narrowband IoT communication between application servers and narrowband IoT devices 130. During normal operation, the LMR communication system operates in the assigned frequency ranges for narrowband communication, for example, 896-897.5 MHz, 900-900.5 MHz, 935-936.5 MHz, and 939.5-940 MHz and the LTE communication system operates over the complete bandwidth of the assigned frequency ranges for broadband communication, for example, 897.5-900.5 MHz and 936.5-939.5 MHz. The LTE communication system may implement the narrowband IoT communication in in-band or the guard band of the LTE spectrum. In some embodiments, the LTE communication system may implement the narrowband IoT as a standalone separate from the LTE spectrum.

Figure 1B:
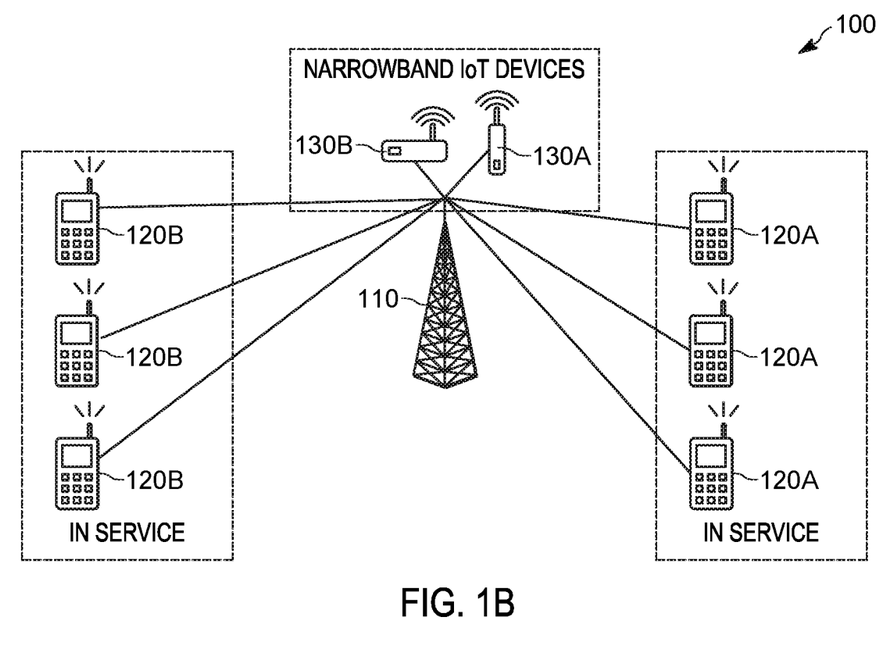
FIG. 1B illustrates the communication system of FIG. 1A during a second mode or during increased demand in accordance with some embodiments.

FIG. 1B illustrates the communication system 100 in a second mode or during increased demand. The capacity of the communication system 100 may be increased to support increased demand for communications, which may occur, for example, during an emergency or mission critical event. For example, during a natural disaster (for example, ice storm, hurricane, tornado, and the like), an influx of personnel may be needed for cleanup or restoration. During such an event, the second plurality of portable communications devices 120B are brought online. Additionally, voice communication is prioritized over data communication to the portable communications devices 120. As discussed above, narrowband LMR communication system provides more reliable voice communication compared to broadband LTE communication system.

In such situations, the bandwidth used for broadband communication may be reduced to support the increased number of portable communications devices 120 operating over the narrowband communication system while maintaining sufficient bandwidth to support narrowband IoT devices 130. The bandwidth available due to reduction of broadband bandwidth is repurposed to support additional channels of the narrowband communication system. For example, during increased demand, the LTE communication system is restricted to operate over frequency ranges 898.3-899.7 MHz and 937.3-938.7 MHz, while the LMR communication system is expanded to operate over frequency ranges 896-898.3 MHz, 899.7-900.5 MHz, 935-9.7.3 MHz, and 938.7-940 MHz. This increased capacity for narrowband communication allows additional carrier channels to be assigned for narrowband communications. When increased capacity is no longer desired, the base station 110 may return to normal operation as illustrated in FIG. 1A.

Figure 2:
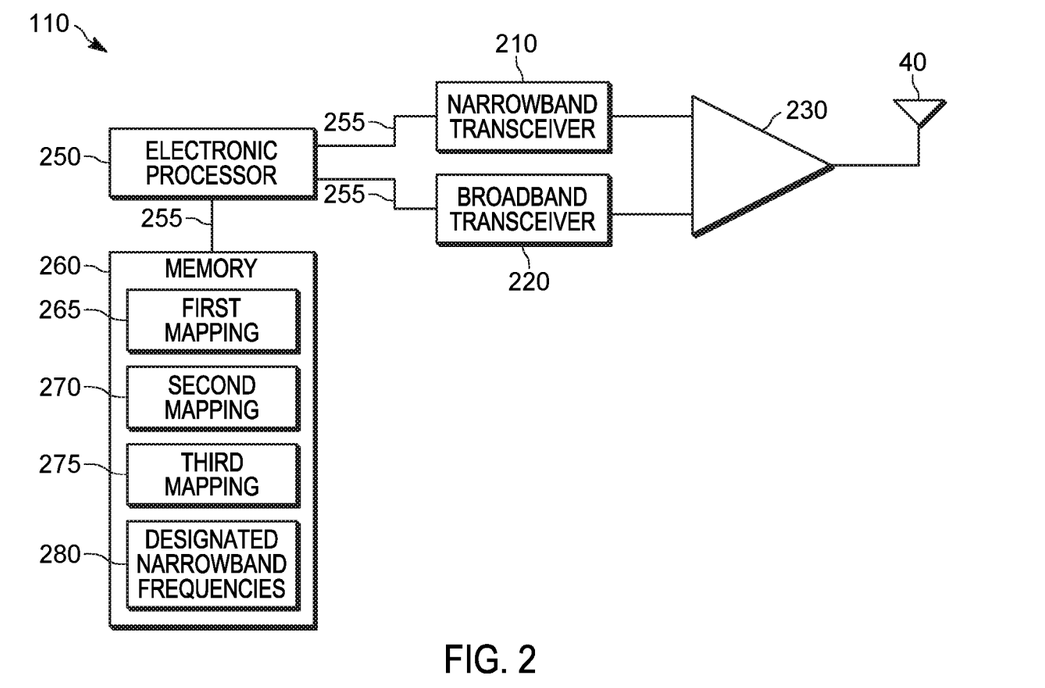
FIG. 2 illustrates a simplified block diagram of the base station of FIGS. 1A-1B in accordance with some embodiments.

FIG. 2 is a simplified block diagram of the base station 110. In the example illustrated, the base station 110 includes a narrowband transceiver 210, a broadband transceiver 220, a power amplifier 230, an antenna 240, an electronic processor 250, and a memory 260. FIG. 2 illustrates only one example embodiment of the base station 110. The base station 110 may include more or fewer components and may perform functions other than those explicitly described herein.

The narrowband transceiver 210, via the power amplifier 230, and the antenna 240 enables communication between the base station 110 and the portable communications devices 120 over a narrowband communication system. In one example, the narrowband transceiver 210 is an LMR transceiver operating over in the narrowband LMR 900 MHz band. The narrowband transceiver 210 may include a plurality of transceivers. The output signal of the plurality of transceivers are combined prior to amplification by the power amplifier 230. In other embodiments, the narrowband transceiver 210 may operate in other narrowband communication systems that are configured to operate simultaneously with broadband communication systems.

The broadband transceiver 220, via the power amplifier 230, and the antenna 240 enables communication between the base station 110 and the portable communications devices 120 over a broadband communication system. In one example, the broadband transceiver 220 is an LTE transceiver operating in the broadband LTE 900 MHz band. The broadband transceiver 220 may include a plurality of transceivers. The output signal of the plurality of transceivers are combined prior to amplification by the power amplifier 230. In some embodiments, the broadband transceiver 220 may also include a narrowband IoT transceiver operating in the narrowband IoT 900 MHz band allocation. In some embodiments, the broadband transceiver 220 may operate in other broadband communication systems that are configured to operate simultaneously with narrowband communication systems.

The electronic processor 250 is coupled to the narrowband transceiver 210 and the broadband transceiver 220 over control and/or data buses 255. The electronic processor 250 provides controls and other signals over the control and/or data buses 255 to the narrowband transceiver 210 and the broadband transceiver 220 as further provided below. In some embodiments, the electronic processor 250 is implemented as a microprocessor with separate memory, for example, memory 260. In other embodiments, the electronic processor 250 is implemented as a microcontroller or digital signal processor (with memory 260 on the same chip). In other embodiments, the electronic processor 250 is implemented using multiple electronic processors. In addition, the electronic processor 250 may be implemented partially or entirely as, for example, a field programmable gate array (FPGA), an application specific integrated circuit (ASIC), and the like and the memory 260 may not be needed or be modified accordingly. In some embodiments, the electronic processor 250 is part of the narrowband transceiver 210, for example, when the base station 110 is a narrowband priority base station 110. In other embodiments, the electronic processor 250 is part of the broadband transceiver 220, for example, when the base station 110 is a broadband priority base station 110. In other embodiments, the electronic processor 250 is implemented using a first electronic processor provided in the narrowband transceiver 210 and the second electronic processor provided in the broadband transceiver 220. In other embodiments, the electronic processor 250 is a zone controller unaffiliated with the narrowband transceiver 210 or the broadband transceiver 220.

In the example illustrated, the memory 260 includes non-transitory, computer readable memory that stores instructions that are received and executed by the electronic processor 250 to carry out the functionality of the base station 110. the memory 260 may include, for example, a program storage area and a data storage area. The program storage area and the data storage area may include combinations of different types of memory, for example, read-only memory and random-access memory.

The memory 260 stores a first mapping 265 between traffic on the narrowband transceiver 210 and a number of carrier channels (for example, a first number of carrier channels) for operating the narrowband transceiver 210 within a predefined blocking rate. The memory 260 stores a second mapping 270 between bandwidth of the broadband transceiver 220 and a number of carrier channels (for example, a second number of carrier channels). The memory 260 stores a third mapping 275 between a bandwidth of the broadband transceiver 220 and RF power budget of shared resources of the base station 110. The memory 260 further stores designated narrowband frequencies 280. The first mapping 265, the second mapping 270, the third mapping 275 and the designated narrowband frequencies 280 is used by the electronic processor 250 to reduce the bandwidth of the broadband communication system and increase the number of channels available for the narrowband communication system as further provided below.

Figure 3:
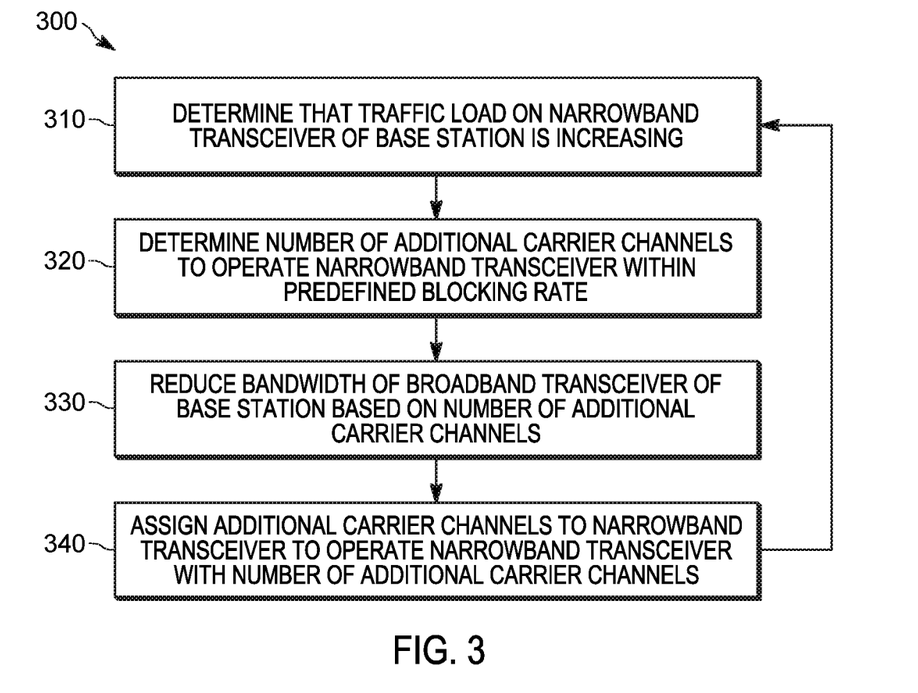
FIG. 3 illustrates a flowchart for a method for operating the base station of FIGS. 1A-1B in accordance with some embodiments.

FIG. 3 is a flowchart of one example method 300 for operating the base station 110. The method 300 is used to switch the base station 110 from normal operation (shown in FIG. 1A) to handle increased narrowband capacity (shown in FIG. 1B). In the example illustrated, the method 300 includes determining, using the electronic processor 250 of the base station 110, that a traffic load on the narrowband transceiver 210 of the base station 110 is increasing (at block 310). The electronic processor 250 may determine that traffic load on the narrowband transceiver 210 is increasing based on user input. For example, an administrator or technician may provide an input to indicate that the base stations 110 is to transition to increased narrowband capacity. In some embodiments, an increased capacity period may be scheduled in advance, for example, for yearly maintenance or other predictable high-capacity events. The base station 110 may transition to handling increased narrowband capacity in response to determining that the traffic load on the narrowband transceiver 210 of the base station 110 is increasing.

The method 300 includes determining, using the electronic processor 250, a number of additional carrier channels to operate the narrowband transceiver 210 within a predefined blocking rate (at block 320). The blocking rate is the time before a push-to-talk (PTT) action results in an outbound or inbound communication (that is, the delay to convey a voice message) and is usually represented as a percentage. The blocking rate may be a requirement for the base station 110 specified by the organization. For example, a utility company may set the blocking rate to not exceed 2%. This organization set rate is then used as the predefined blocking rate. In some embodiments, a nominal blocking rate, for example, 3% may be used as the predefined blocking rate. The nominal or user specific blocking rate may be stored in the memory 260 during installation or may be modified by a user based on the requirements of the situation. The electronic processor 250 determines a number of additional carrier channels desired to support the increased capacity without exceeding the predefined blocking rate.

Figure 4:
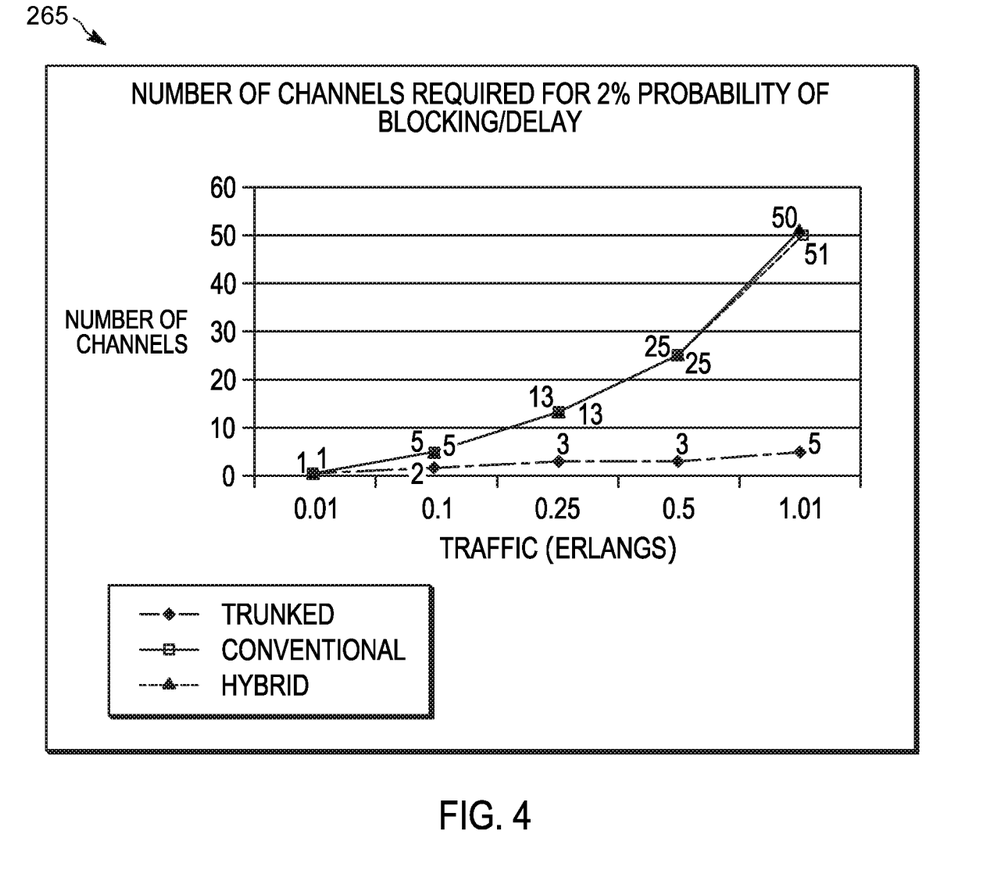
FIG. 4 is a graphical illustration of a mapping between a number of channels required to achieve a predefined blocking rate plotted against traffic on a narrowband transceiver of the base station of FIGS. 1A-1B in accordance with some embodiments.

As discussed above, the memory 260 stores the first mapping 265 between traffic on the narrowband transceiver 210 and a number of carrier channels for operating the narrowband transceiver 210 within a predefined blocking rate. The first mapping 265 correlates the traffic on a narrowband transceiver 210 to the number of additional carrier channels needed to achieve a blocking rate of 2% or less. Traffic is measured in, for example, Erlangs (E). FIG. 4 is a graphical illustration of the first mapping 265 with traffic provided on the X-axis and the number of channels required for 2% probability of blocking (that is, blocking rate) provided on the Y-axis. The first mapping 265 is provided with respect to three types of narrowband communication systems: (i) trunked; (ii) conventional; and (iii) hybrid. In one example, when the traffic is increased to 0.5 E, the narrowband communication system requires 25 channels for a conventional or hybrid communication system and requires 3 channels for a trunked communication system. The first mapping 265 may be pre-stored during implementation based on tests performed prior to implementation. In some embodiments, the first mapping 265 may be updated based on usage of the base station 110. The electronic processor 250 uses the first mapping 265 to determine the number of additional carrier channels.

The method 300 includes reducing, using the electronic processor 250, a bandwidth of the broadband transceiver 220 of the base station 110 based on the number of additional carrier channels (at block 330). The electronic processor 250 may first determine whether the number of additional channels can be supported by the current allocation of the spectrum while meeting the predefined blocking rate. When the additional channels can be supported by the current allocation of the spectrum (that is, the allocation during normal operation), the electronic processor 250 proceeds to control the narrowband transceiver 210 to use the additional number of channels. When the additional channels cannot be supported by the current allocation of the spectrum (that is, the allocation during normal operation), the electronic processor 250 control the broadband transceiver 220 to operate over a reduced bandwidth.

As discussed above, the memory 260 stores the second mapping 270 between bandwidth of the broadband transceiver 220 and a number of carrier channels. The second mapping 270 correlates the number of carrier channels of the narrowband transceiver 210 to the bandwidth of operation of the broadband transceiver 220. The normal bandwidth of the broadband communication system is 3 MHz for the LTE communication system in the 900 MHz band. The 3 MHz bandwidth is used by the broadband transceiver 220 during normal operation. When additional carrier channels are desired for the narrowband transceiver 210, the broadband bandwidth may be reduced to 1.4 MHz. The second mapping 270 therefore correlates the broadband bandwidth between 3 MHZ and 1.4 MHz to the number of channels desired for the narrowband LMR communication system. The electronic processor 250 determines an allowed bandwidth of the broadband transceiver 220 based on the number of additional carrier channels using the second mapping 270. The bandwidth of the broadband transceiver 220 is reduced to the allowed bandwidth.

As discussed above, the memory 260 stores the third mapping 275 between the bandwidth of the broadband transceiver 220 and RF power budget of shared resources of the base station 110. The shared resources is, for example, the power amplifier 230. The third mapping 275 correlates the RF power budget of the shared resources (for example, the peak power budget of the power amplifier 230). In some embodiments, as discussed above, the additional carrier channels for the narrowband communication system needed to support the increase capacity may be accommodated within the normal allocation of the spectrum between the narrowband and broadband communication systems. However, the broadband bandwidth may still be reduced based on share of the RF power budget occupied by the additional carrier channels for the narrowband communication system.

Figure 5A:
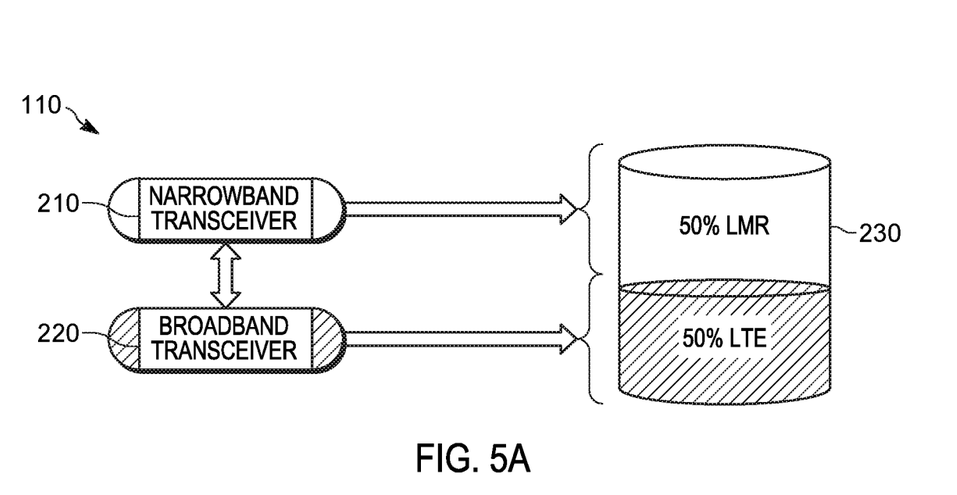
FIGS. 5A and 5B illustrate an allocation of peak power budget of a power amplifier between a narrowband transceiver and a broadband transceiver of the base station of FIGS. 1A-1B in accordance with some embodiments.
Figure 5B:
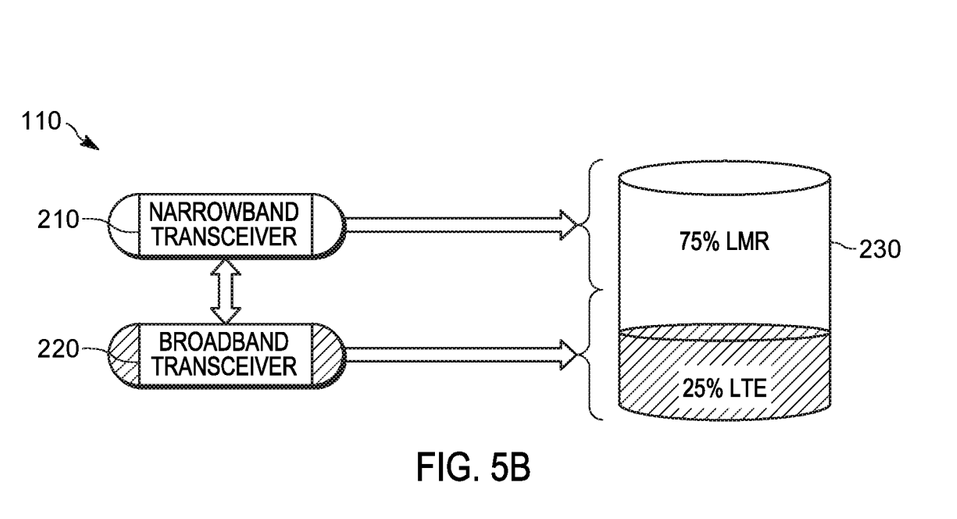

FIGS. 5A and 5B illustrate one example of allocation of peak power budget of the power amplifier 230 between the narrowband transceiver 210 and the broadband transceiver 220. FIG. 5A illustrates the allocation of the peak power budget of the power amplifier 230 during normal operation (as shown in FIG. 1A). The peak power is divided equally (that is, 50% each) between the narrowband transceiver 210 and the broadband transceiver 220. FIG. 5B illustrates the allocation of the peak power budget of the power amplifier 230 during increased capacity operation (as shown in FIG. 1B). The additional carrier channels of the narrowband transceiver 210 may require additional share (for example, 75%) of the peak power budget of the power amplifier 230 compared to the broadband transceiver 220. The power requirements of the broadband transceiver 220 can be reduced by reducing the bandwidth of the broadband transceiver 220. The electronic processor 250 determines an allowed bandwidth of the broadband transceiver 220 based on the RF power budget of shared resources using the third mapping 275. The bandwidth of the broadband transceiver 220 is reduced to the allowed bandwidth.

The method 300 includes assigning, using the electronic processor 250, additional carrier channels to the narrowband transceiver 210 to operate the narrowband transceiver 210 with the number of additional carrier channels (at block 340). As discussed above, the memory 260 stores the designated narrowband frequencies 280. The designated narrowband frequencies 280 include the frequencies covering the spectrum re-allocated from the temporary or extended reduction of broadband allocation. The narrowband transceiver 210 operates over the original carrier channels and the additional carrier channels to increase the capacity of the narrowband communication system.

In some embodiments, the electronic processor 250 may gracefully vacate the broadband bandwidth by determining whether the bandwidth of the broadband transceiver 220 has been reduced. That is, the electronic processor 250 completes active data transmission in the affected resource blocks (or ensures that active data transmission is complete) before reducing the bandwidth of the broadband transceiver 220. The electronic processor 250 may determine whether the broadband transceiver 220 has completed transitioning to lower bandwidth. The additional carrier channels are assigned to the narrowband transceiver 210 in response to determining that the bandwidth of the broadband transceiver 220 has been reduced. Graceful vacating is suitable, for example, for scheduled events where there is sufficient opportunity for the broadband transceiver 220 to reduce the bandwidth by clearing traffic.

In other embodiments, the electronic processor 250 may ruthlessly preempt the broadband bandwidth. That is, the electronic processor 250 reduces the bandwidth of the broadband transceiver 220 whether the active data transmission in the affected resource blocks has completed or not. Ruthless preemption is suitable, for example, in emergency situations (for example, natural disaster, fires, chemical leaks, and the like).

Figure 6:
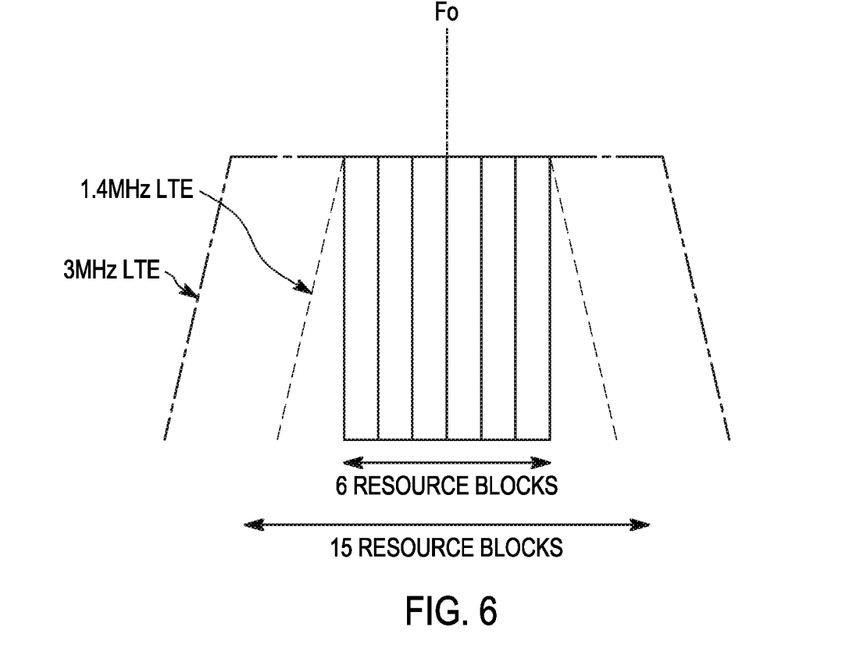
FIG. 6 illustrates changes in bandwidth of the broadband transceiver of the base station of FIGS. 1A-1B in accordance with some embodiments.

FIG. 6 illustrates the reduction of the bandwidth of the broadband transceiver 220. In the example illustrated, the broadband transceiver 220 operates over a 3 MHz LTE bandwidth during normal operation (shown in FIG. 1A). The 3 MHz LTE bandwidth includes 15 resource blocks for the broadband transceiver 220 to use for the broadband LTE communication system. When the capacity of the narrowband transceiver 210 is to be increased (shown in FIG. 1B), the 3 MHz LTE bandwidth may be reduced to 1.4 MHz LTE bandwidth. The 1.4 MHz LTE bandwidth includes 6 resource block for broadband transceiver 220 to use for the broadband LTE communication system. The broadband bandwidth may be reduced such that the center frequency remains the same. In the example illustrated, the bandwidth is reduced from 3 MHz to 1.4 MHz, while retaining the center frequency of FO. This allows the portable communications devices 120 receiving the LTE signals to still receive the synchronization channels of the LTE communication system. Accordingly, although the throughput may be reduced, the functionality of the LTE communication system may remain the same during reduced bandwidth.

Figure 7:
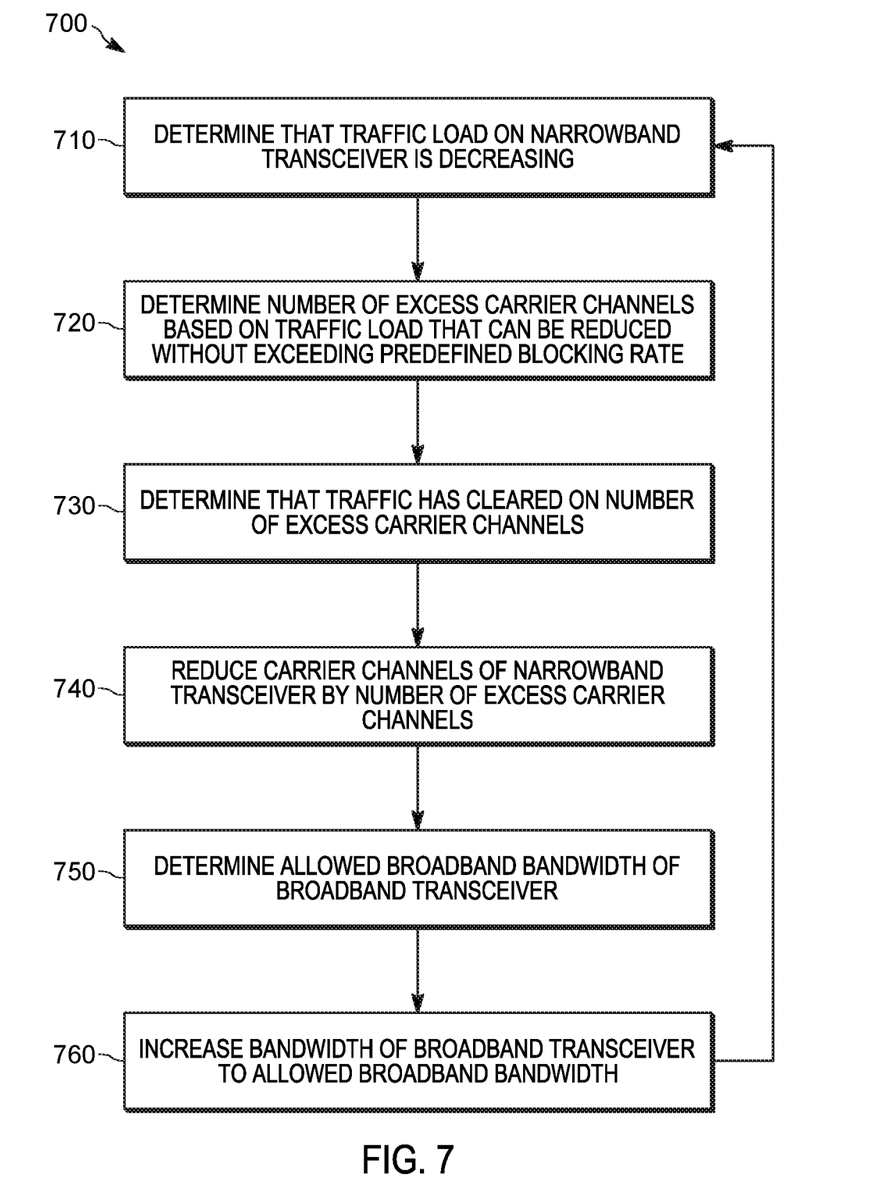
FIG. 7 illustrates a flowchart for a method for operating the base station of FIGS. 1A-1B in accordance with some embodiments.

FIG. 7 is a flowchart of one example method 700 for operating the base station 110. The method 700 is used to switch the base station 110 from handling increased narrowband capacity (shown in FIG. 1B) to normal operation (shown in FIG. 1A). In the example illustrated, the method 700 includes determining, using the electronic processor 250, that the traffic load on the narrowband transceiver 210 is decreasing (at block 710). The electronic processor 250 may determine that traffic load on the narrowband transceiver 210 is decreasing based on user input. For example, an administrator or technician may provide an input to indicate the completion of a maintenance or emergency event. In some embodiments, the electronic processor 250 may determine that the traffic load is decreasing at the end of a schedule event. The base station 110 may transition to normal operation in response to determining that the traffic load on the narrowband transceiver 210 is decreasing.

The method 700 includes determining, using the electronic processor 250, a number of excess carrier channels based on the traffic load that can be reduced without exceeding the predefined blocking rate (at block 720). The electronic processor 250 uses the first mapping 265 to determine the number of excess carrier channels. The electronic processor 250 controls the narrowband transceiver 210 to reduce the excess carrier channels. For example, the excess carrier channels are chosen from the designated narrowband frequencies 280.

The method 700 includes determining, using the electronic processor 250, that traffic has cleared on the number of excess carrier channels (at block 730). The electronic processor 250 may reassign the current communication on the number of excess carrier channels to other channels that are not covered by the normal broadband bandwidth. The method 700 includes reducing, using the electronic processor 250, carrier channels of the narrowband transceiver 210 by the number of excess carrier channels after the traffic has cleared on the number of excess carrier channels (at block 740).

The method 700 includes determining, using the electronic processor 250, an allowed bandwidth of the broadband transceiver 220 after the traffic has cleared on the number of excess carrier channels (at block 750). In some embodiments, the electronic processor 250 determines an allowed bandwidth of the broadband transceiver 220 based on the number of additional carrier channels using the second mapping 270. In other embodiments, the electronic processor 250 determines an allowed bandwidth of the broadband transceiver 220 based on the RF power budget of shared resources using the third mapping 275 and the designated narrowband frequencies 280.

The method 700 includes increasing the bandwidth of the broadband transceiver 220 to the allowed bandwidth (at block 760). In the example illustrated in FIG. 6, when the capacity of the narrowband transceiver 210 is decreased (shown in FIG. 1A), the 1.4 MHz LTE bandwidth may be increased to 3 MHz LTE bandwidth.

Figure 8:
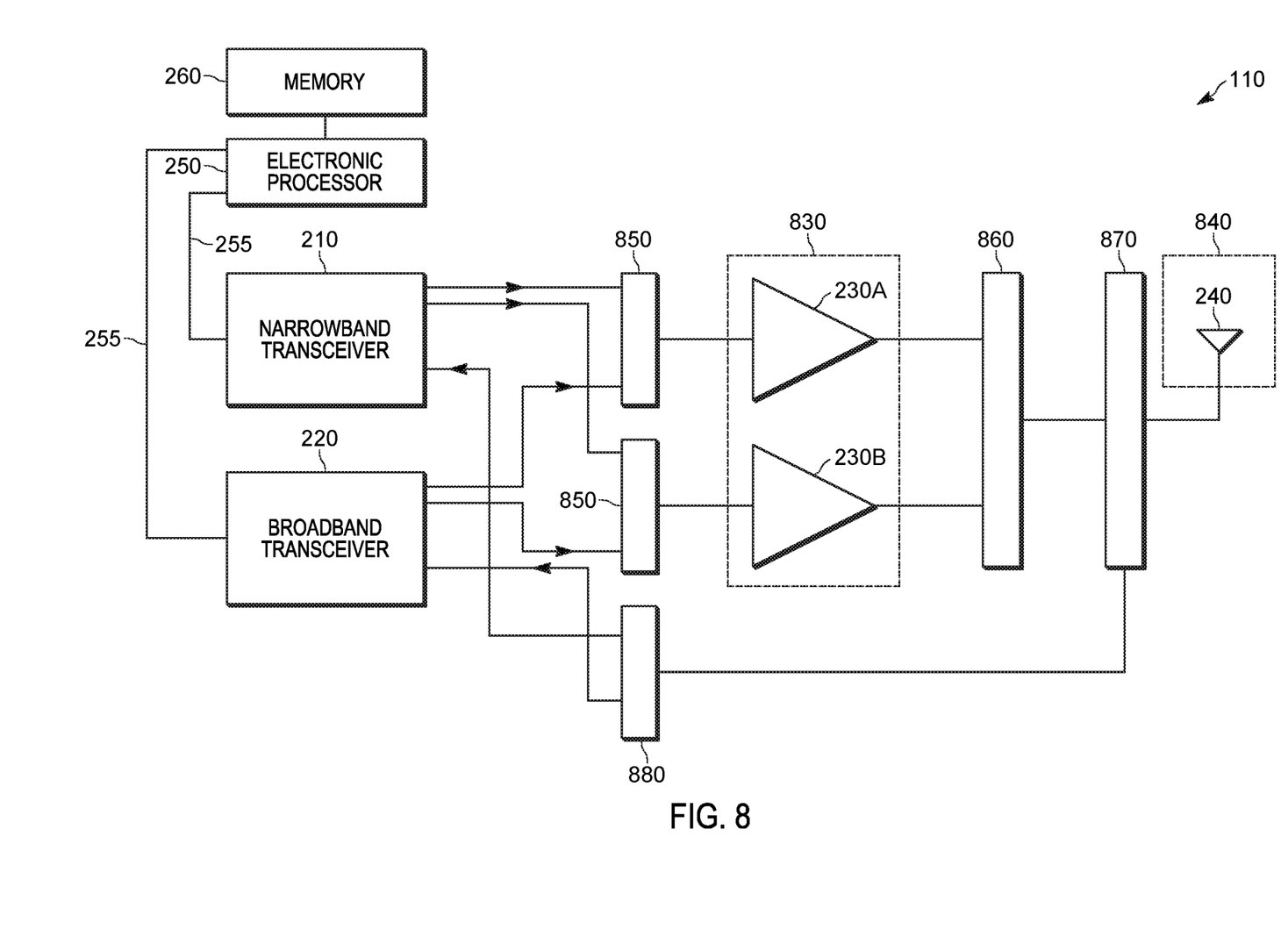
FIG. 8 illustrates a simplified block diagram of the base station of FIGS. 1A-1B having shared hardware in accordance with some embodiments.

In addition to sharing spectral resources, the narrowband communication system and the broadband communication system may also share hardware resources. FIG. 8 illustrates an example implementation of the base station 110 with shared resources. The base station 110 includes power amplifier system 830 and an antenna system 840 coupled to the narrowband transceiver 210 and the broadband transceiver 220. The power amplifier system 830 is coupled between (i) the narrowband transceiver 210 and the broadband transceiver 220, and (ii) the antenna system 840 and includes a first power amplifier 230A and a second power amplifier 230B. The narrowband transceiver 210 and the broadband transceiver 220 share power resources of the power amplifier system 830. The power amplifier system 830 may include more or fewer power amplifiers 230 based on the capacity needs of the base station 110. The antenna system 840 includes the antenna 240. The antenna system 840 may include more antennas 240 based on the coverage area and the capacity needs of the base station 110.

The base station 110 includes first combiners 850 (for example, hybrid combiners) coupled between (i) the narrowband transceiver 210 and the broadband transceiver 220; and (ii) the power amplifier system 830. The first combiners 850 are configured to combine first RF signals from the narrowband transceiver 210 and the broadband transceiver 220 and provide the combined first RF signals to the power amplifier system 830. The base station 110 includes a second combiner 860 (for example, a hybrid combiner) coupled between the power amplifier system 830 and the antenna system 840. The second combiner 860 is configured to combine second RF signals from the power amplifier system 830 and provides the combined second RF signals to the antenna system 840.

The base station 110 includes a duplexer 870 coupled between (i) the narrowband transceiver 210 and the broadband transceiver 220, and (ii) the antenna system 840. Specifically, the duplexer 870 is coupled between the second combiner 860 and the antenna system 840 on the transmission path. The duplexer 860 is configured to provide third RF signals from the narrowband transceiver 210 and the broadband transceiver 220 to the antenna system 840 and to provide fourth RF signals from the antenna system 840 to the narrowband transceiver 210 and the broadband transceiver 220. The base station 110 includes a multicoupler 880 coupled between (i) the narrowband transceiver 210 and the broadband transceiver 220; and (i) the duplexer 870. The multicoupler 880 is configured to split the fourth RF signals from the duplexer 860 into multiple outputs (for example, split RF signals) and feeds the outputs to the narrowband transceiver 210 and the broadband transceiver 220.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A base station operating in a narrowband spectrum and broadband spectrum that share a band allocation of RF spectrum, the base station comprising:
   a narrowband transceiver;
   a broadband transceiver; and
   an electronic processor coupled to the narrowband transceiver and the broadband transceiver and configured to
      determine that a traffic load on the narrowband transceiver is increasing,
      determine a number of additional carrier channels based on the traffic load to operate the narrowband transceiver within a predefined blocking rate,
      reduce a bandwidth of the broadband transceiver based on the number of additional carrier channels, and
      assign additional carrier channels to the narrowband transceiver to operate the narrowband transceiver with the number of additional carrier channels.

2. The base station of claim 1, wherein the electronic processor is further configured to
   determine that the traffic load on the narrowband transceiver is decreasing;
   determine a number of excess carrier channels based on the traffic load that can be reduced without exceeding the predefined blocking rate;
   determine that traffic has cleared on the number of excess carrier channels;
   reduce carrier channels of the narrowband transceiver by the number of excess carrier channels after the traffic has cleared on the number of excess carrier channels;
   determine an allowed bandwidth of the broadband transceiver after the traffic has cleared on the number of excess carrier channels; and
   increase the bandwidth of the broadband transceiver to the allowed bandwidth.

3. The base station of claim 1, wherein the electronic processor is further configured to
   determine that the bandwidth of the broadband transceiver has been reduced, wherein the additional carrier channels are assigned to the narrowband transceiver in response to determining that the bandwidth of the broadband transceiver has been reduced.

4. The base station of claim 1, wherein the additional carrier channels are assigned to the narrowband transceiver without regard to whether the bandwidth of the broadband transceiver has been reduced.

5. The base station of claim 1, further comprising a memory coupled to the electronic processor and configured to store a first mapping between traffic on the narrowband transceiver and a first number of carrier channels for operating the narrowband transceiver within the predefined blocking rate, wherein the electronic processor uses the first mapping to determine the number of additional carrier channels.

6. The base station of claim 5, wherein the memory is further configured to store a second mapping between bandwidth of the broadband transceiver and a second number of carrier channels, wherein the electronic processor is further configured to
   determine, using the second mapping, an allowed bandwidth of the broadband transceiver based on the number of additional carrier channels, wherein the bandwidth of the broadband transceiver is reduced to the allowed bandwidth.

7. The base station of claim 5, wherein the memory is further configured to store a third mapping between a bandwidth of the broadband transceiver and RF power budget of shared resources of the base station, wherein the electronic processor is further configured to
   determine, using the third mapping, an allowed bandwidth of the broadband transceiver based on the RF power budget of the shared resources, wherein the bandwidth of the broadband transceiver is reduced to the allowed bandwidth.

8. The base station of claim 5, wherein the memory is further configured to store designated narrowband frequencies, wherein the additional carrier channels are selected from the designated narrowband frequencies.

9. The base station of claim 1, further comprising:
an antenna system coupled to the narrowband transceiver and the broadband transceiver; and
a power amplifier system coupled between (i) the narrowband transceiver and the broadband transceiver, and (ii) the antenna system,
wherein the narrowband transceiver and the broadband transceiver share power resources of the power amplifier system.

10. The base station of claim 9, further comprising:
a combiner coupled between (i) the narrowband transceiver and the broadband transceiver, and (ii) the power amplifier system, the combiner configured to combine RF signals from the narrowband transceiver and the broadband transceiver and provide combined RF signals to the power amplifier system.

11. The base station of claim 9, further comprising:
a duplexer coupled between (i) the narrowband transceiver and the broadband transceiver, and (ii) the antenna system, the duplexer configured to provide first RF signals from the narrowband transceiver and the broadband transceiver to the antenna system and to provide second RF signals from the antenna system to the narrowband transceiver and the broadband transceiver.

12. The base station of claim 11, further comprising:
a multicoupler coupled between (i) the duplexer, and (ii) the narrowband transceiver and the broadband transceiver, the multicoupler configured to split the second RF signals and provide the split RF signals to the narrowband transceiver and the broadband transceiver.

13. A method for operating a base station comprising:
determining, using an electronic processor of the base station, that a traffic load on a narrowband transceiver of the base station is increasing;
determining, using the electronic processor, a number of additional carrier channels to operate the narrowband transceiver within a predefined blocking rate;
reducing, using the electronic processor, a bandwidth of a broadband transceiver of the base station based on the number of additional carrier channels; and
assigning, using the electronic processor, additional carrier channels to the narrowband transceiver to operate the narrowband transceiver with the number of additional carrier channels.

14. The method of claim 13, further comprising:
determining that the traffic load on the narrowband transceiver is decreasing;
determining a number of excess carrier channels based on the traffic load that can be reduced without exceeding the predefined blocking rate;
determining that traffic has cleared on the number of excess carrier channels;
reducing carrier channels of the narrowband transceiver by the number of excess carrier channels after the traffic has cleared on the number of excess carrier channels;
determining an allowed bandwidth of the broadband transceiver after the traffic has cleared on the number of excess carrier channels; and
increasing the bandwidth of the broadband transceiver to the allowed bandwidth.

15. The method of claim 13, further comprising:
determining that the bandwidth of the broadband transceiver has been reduced, wherein the additional carrier channels are assigned to the narrowband transceiver in response to determining that the bandwidth of the broadband transceiver has been reduced.

16. The method of claim 13, wherein the additional carrier channels are assigned to the narrowband transceiver without regard to whether the bandwidth of the broadband transceiver has been reduced.

17. The method of claim 13, further comprising:
storing, using a memory, a first mapping between traffic on the narrowband transceiver and a first number of carrier channels for operating the narrowband transceiver within the predefined blocking rate, wherein the first mapping is used to determine the number of additional carrier channels.

18. The method of claim 17, further comprising:
storing, using the memory, a second mapping between bandwidth of the broadband transceiver and a second number of carrier channels; and
determining, using the second mapping, an allowed bandwidth of the broadband transceiver based on the number of additional carrier channels, wherein the bandwidth of the broadband transceiver is reduced to the allowed bandwidth.

19. The method of claim 17, further comprising:
storing, using the memory, a third mapping between a bandwidth of the broadband transceiver and RF power budget of shared resources of the base station, the method further comprising:
determining, using the third mapping, an allowed bandwidth of the broadband transceiver based on the RF power budget of the shared resources, wherein the bandwidth of the broadband transceiver is reduced to the allowed bandwidth.

20. The method of claim 17, further comprising:
storing, using the memory, designated narrowband frequencies, wherein the additional carrier channels are selected from the designated narrowband frequencies.

* * * * *